United States Patent [19]

O'Callaghan et al.

[11] Patent Number: 4,702,743
[45] Date of Patent: Oct. 27, 1987

[54] LIQUID DYE PREPARATIONS ANIONIC DYES AND POLYALKYLENE-OXY NAPHTHALENE DERIVATIVES

[75] Inventors: Patrick O'Callaghan, Baldock; Henry R. Murton, Prestwich, both of United Kingdom

[73] Assignee: Imperial Chemical Industries PLC, London, England

[21] Appl. No.: 859,712

[22] Filed: May 5, 1986

[30] Foreign Application Priority Data

May 16, 1985 [GB] United Kingdom ............... 8512401

[51] Int. Cl.$^4$ ..................... C09B 67/00; C09B 67/26
[52] U.S. Cl. .......................................... 8/527; 8/583; 8/588; 8/610; 8/613; 8/680
[58] Field of Search ..................... 8/527, 610, 613

[56] References Cited

U.S. PATENT DOCUMENTS

| | | | |
|---|---|---|---|
| 3,425,785 | 2/1969 | Hertel | 8/527 |
| 4,270,917 | 6/1981 | Heald et al. | 8/527 |
| 4,311,480 | 1/1982 | Price et al. | 8/527 |
| 4,373,930 | 2/1983 | Rothwell | 8/527 |
| 4,436,522 | 3/1984 | Niwa et al. | 8/524 |

Primary Examiner—A. Lionel Clingman
Attorney, Agent, or Firm—Cushman, Darby & Cushman

[57] ABSTRACT

A liquid dye preparation comprising an aqueous solution containing at least 0.5% by weight of a water-soluble anionic dye and at least 0.1% by weight of a surfactant of the formula:

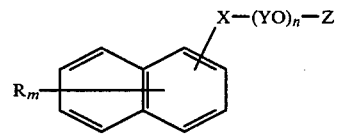

wherein
R represents a non-ionic substituent,
m represents an integer from 0 to 3,
X represents a divalent bridging atom or group,
Y represents a $C_{2\text{-}4}$ alkylene radical,
n represents an integer of at least 2, and
Z represents hydrogen, akyl, sulpho or phosphino.

9 Claims, No Drawings

LIQUID DYE PREPARATIONS ANIONIC DYES AND POLYALKYLENE-OXY NAPHTHALENE DERIVATIVES

This invention relates to liquid dye preparations and especially to concentrated aqueous solutions of anionic dyes.

Water-soluble anionic dyes are currently formulated, in the main, as powders. These can be dusty causing an environmental hazard and they are not suitable for automatic metering until dissolved in water, an operation which can be time-consuming and difficult. There is therefore a need for liquid dye preparations, particularly aqueous solutions, which avoid these problems. Such solutions need to be concentrated in order to reduce the volume of the product to a minimum and reduce transportation and packaging costs but the aqueous solubility of anionic dyes is often insufficient to permit the preparation of concentrated solutions especially when the dye is contaminated by inorganic salts from the manufacturing process. Agents are known, however, which have the effect of increasing the aqueous solubility of anionic dyes. Such agents include urea and caprolactam which are commonly used for this purpose whilst other agents proposed include alkylphenol ethylene oxide condensates although these are generally much less effective.

It has now been found that the aqueous solubility of anionic dyes may be significantly increased by the presence of polyalkyleneoxy compounds based on naphthalene, the effect being much greater than could have been predicted from the behaviour of the corresponding alkylphenol ethoxylates.

Accordingly, the invention provides a liquid dye preparation comprising an aqueous solution containing at least 0.5% by weight of a water-soluble anionic dye and at least 0.1% by weight of a surfactant of the formula:

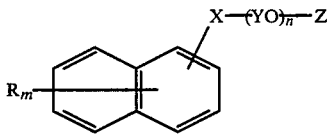

wherein
R represents a non-ionic substituent,
m represents an integer from 0 to 3,
X represents a divalent bridging atom or group,
Y represents a $C_{2-4}$ alkylene radical,
n represents an integer of at least 2, and
Z represents hydrogen, alkyl or sulpho.

Non-ionic substituents which may be represented by R include halogen, alkoxy, alkenyl and alkyl, especially $C_{1-4}$ alkyl.

Divalent bridging groups which may be represented by X include —S—, —COO— and —NQ— wherein Q is hydrogen, lower alkyl or a further $(YO)_n Z$ group but the preferred bridging group is —O—.

Typical values for n are usually in the range 3–100 and Y is preferably an ethylene radical. Z is preferably H or $SO_3H$.

Especially useful surfactants for use in the dye preparations have the formula:

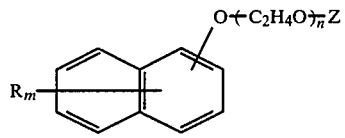

wherein
R is $C_{1-4}$ alkyl,
m is 0 or 1,
n is 3–100, preferably 5–30, more especially 8–12, and
Z is H or $SO_3H$.

Particular mention may be made of the adduct of 2-naphthol with 10 molecular proportions of ethylene oxide and its sulphuric acid ester.

The water-soluble anionic dye may be, for example, an acid, direct or reactive dye and it may belong to any of the known chemical classes, for example, the azo, anthraquinone, triphenodioxazine and phthalocyanine classes. Particularly important dyes are those which, in the absence of the surfactant, have low solubility in water. The dye may be in the free acid form but is preferably in the form of a salt, for example a sodium, potassium, lithium, ammonium or alkanolamine salt. The concentration of dye in the liquid preparations will vary from dye to dye. In some cases, the production of a liquid preparation containing 1% by weight of dye is a useful improvement. In other cases, the liquid preparations will contain at least 10% by weight of dye.

The surfactant may be present in the liquid preparations in an amount of from 0.1 to 50% by weight but concentrations of from 1 to 30% and especially from 5 to 20% by weight are common.

The preparations can also contain other normal ingredients of such compositions, for example anti-foaming agents, buffers, humectants, thickeners, diluents and preservatives.

The preparations of the invention, which may be made by mixing the dye and surfactant with water in appropriate proportions, may be used in conventional coloration processes, for example textile printing and dyeing processes.

The invention is illustrated but not limited by the following Examples, in which CPC represents the copper phthalocyanine chromophore.

EXAMPLE 1

A liquid formulation was prepared of the following dye:

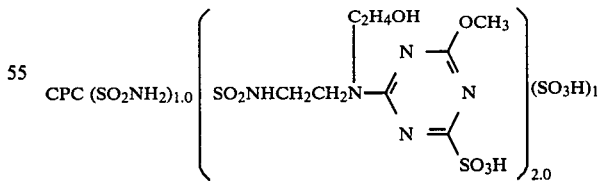

30 g of the salt-free dye were mixed with 7.5 g of 2-naphthol condensed with 10 molecular proportions of ethylene oxide, 0.75 g of sodium diethylaniline sulphonate and 61.75 g of water. The pH was adjusted to 7.5. The formulation was fluid down to 0° C., and showed no significant printing strength deterioration or increase in viscosity on storage for 14 days at 60° C. Similar formulations in which the non-ionic agent was replaced by urea or caprolactam were reduced significantly in their printing strength after a similar storage period at 60° C. Formulations in which the non-ionic agent was replaced by an alkyl or alkylphenol based agent, were unaccpetably viscous at 0° C.

EXAMPLE 2

A liquid formulation was prepared containing the sodium salt of the following dye:

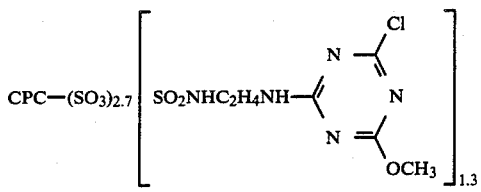

1 g of a commercial brand of the dye (containing conventional diluents) was mixed with 47.5 g of distilled water and 1.5 g of sodium chloride.

The mixture was left to stand for 30 minutes and then filtered to remove any precipitated dye. The optical density of the filtrate was determined at the wavelength of maximum absorbance of the dye and multiplied by a factor $\mu_1$ to generate the value 1.0.

A second mixture was prepared in the same way except that 2 g of the water were replaced by 2 g of a 10% solution of the adduct of 2-naphthol with 10 moles of ethylene oxide. The mixture was filtered after 30 minutes standing and the optical density of the filtrate recorded. The value of the optical density multiplied by $\mu_1$ was 1.5 indicating that substantially more dye was dissolved than in the absence of the naphthol adduct.

A third mixture was prepared in the same way except that 2 g of the water were replaced by 2 g of a 10% solution of the adduct of orthophenylphenol with 10 moles of ethylene oxide. The mixture was filtered after 30 minutes standing and the optical density of the filtrate recorded. The value of the optical density multiplied by $\mu_1$ was 1.1 indicating that less dye was dissolved in the filtrate than when the naphthol adduct was used.

A fourth mixture was prepared in the same way except that 2 g of the water were replaced by 2 g of a 10% solution of the adduct of bisphenol with 15 moles of ethylene oxide. The mixture was filtered after 30 minutes standing and the optical density of the filtrate recorded. The value of the optical density multiplied by $\mu_1$ was 1.3 indicating that less dye was dissolved in the filtrate than when the naphthol adduct was used.

EXAMPLE 3

A liquid formulation was prepared containing the sodium salt of the following yellow dye:

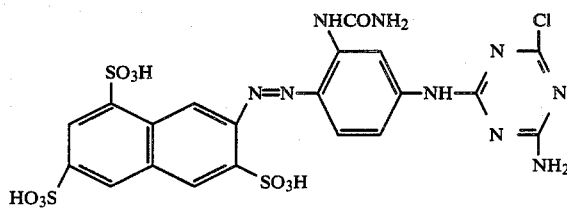

The components of the mixture were as follows:

| Dye (commercial brand) | 3 g |
| --- | --- |
| Distilled water | 45.5 g |
| Sodium chloride | 1.5 g |

The mixture was left to stand for 30 minutes and then filtered to remove any precipitated dye. The optical density of the filtrate was determined at the wavelength of maximum absorbance of the dye and multiplied by a factor $\mu_2$ to generate the value 1.0.

A second mixture was prepared in the same way except that 6 g of the water were repalced by 6 g of a 10% solution of the adduct of 2-naphthol with 10 moles of ethylene oxide. The mixture was filtered after 30 minutes standing and the optical density of the filtrate recorded. The value of the optical density multiplied by $\mu_2$ was 3.9 indicating that substantially more dye was dissolved in the filtrate than in the absence of the naphthol adduct.

A third mixture was prepared in the same way except that 6 g of the water were replaced by 6 g of a 10% solution of the adduct of orthophenylphenol with 10 moles of ethylene oxide. The mixture was filtered after 30 minutes standing and the optical density of the filtrate recorded. The value of the optical density multiplied by $\mu_2$ was 0.9 indicating that less dye was dissolved in the filtrate than when the naphthol adduct was used.

A fourth mixture was prepared in the same way except that 6 g of the water were replaced by 6 g of a 10% solution of the adduct of bisphenol with 15 moles of ethylene oxide. The mixture was filtered after 30 minutes standing and the optical density of the filtrate recorded. The value of the optical density multiplied by $\mu_2$ was 0.9 indicating that less dye was dissolved in the filtrate than when the naphthol adduct was used.

EXAMPLE 4

A liquid formulation was prepared containing the sodium salt of the following dye:

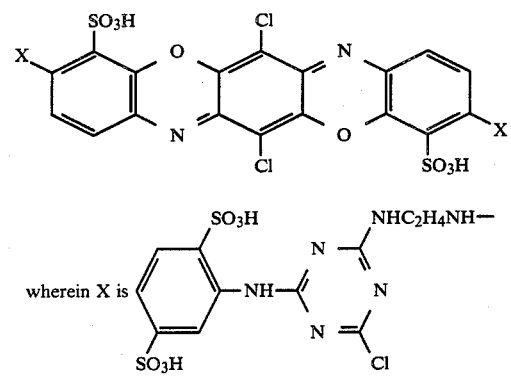

The components of the mixture were as follows:

| Dye (commercial brand) | 4 g |
| --- | --- |
| Distilled water | 44.5 g |
| Sodium chloride | 1.5 g |

The mixture was left to stand for 30 minutes and then filtered to remove any precipitated dye. The optical density of the filtrate was determined at the wavelength of maximum absorbance of the dye and multiplied by a factor $\mu_3$ to generate the value 1.0.

A second mixture was prepared in the same way except that 8 g of the water were replaced by 8 g of a 10% solution of the adduct of 2-naphthol with 10 moles of ethylene oxide. The mixture was filtered after 30 minutes standing and the optical density of the filtrate recorded. The value of the optical density multiplied by $\mu_3$ was 2.5 indicating that substantially more dye was dissolved in the filtrate than in the absence of the naphthol adduct.

A third mixture was prepared in the same way except that 8 g of the water were replaced by 8 g of a 10% solution of the adduct of orthophenylphenol with 10 moles of ethylene oxide. The mixture was filtered after 30 minutes standing and the optical density of the filtrate recorded. The value of the optical density multiplied by $\mu_3$ was 1.3 indicating that less dye was dissolved in the filtrate than when the naphthol adduct was used.

A fourth mixture was prepared in the same way except that 8 g of the water were replaced by 8 g of a 10% solution of the adduct of bisphenol with 15 moles of ethylene oxide. The mixture was filtered after 30 minutes standing and the optical density of the filtrate recorded. The value of the optical density multiplied by $\mu_3$ was 1.4 indicating that less dye was dissolved in the filtrate than when the naphthol adduct was used.

EXAMPLE 5

A liquid formulation was prepared containing the sodium salt of the following blue dye:

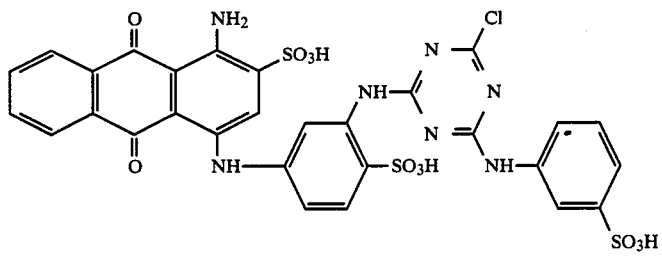

The components of the mixture were as follows:

| Dye (commelcial brand) | 2.5 g |
| --- | --- |
| Distilled water | 46.0 g |
| Sodium chloride | 1.5 g |

The mixture was left to stand for 30 minutes and then filtered to remove any precipitated dye. The optical density of the filtrate was determined at the wavelength of maximum absorbance of the dye and multiplied by a factor $\mu_4$ to generate the value 1.0.

A second mixture was prepared in the same way except that 5 g of the water were replaced by 5 g of a 10% solution of the adduct of 2-naphthol with 10 moles of ethylene oxide. The mixture was filtered after 30 minutes standing and the optical density of the filtrate recorded. The value of the optical density multiplied by $\mu_4$ was 1.7 indicating that substantially more dye was dissolved in the filtrate than in the absence of the naphthol adduct.

A third mixture was prepared in the same way except that 5 g of the water were replaced by 5 g of a 10% solution of the adduct of orthophenylphenol with 10 moles of ethylene oxide. The mixture was filtered after 30 minutes standing and the optical density of the filtrate recorded. The value of the optical density multiplied by $\mu_4$ was 1.0 indicating that less dye was dissolved in the filtrate than when the naphthol adduct was used.

A fourth mixture was prepared in the same way except that 5 g of the water were replaced by 5 g of a 10% solution of the adduct of bisphenol with 15 moles of ethylene oxide. The mixture was filtered after 30 minutes standing and the optical density of the filtrate recorded. The value of the optical density multiplied by $\mu_4$ was 0.95 indicating that less dye was dissolved in the filtrate than when the naphthol adduct was used.

EXAMPLE 6

A liquid formulation was prepared containing the sodium salt of the following dye:

$$CPC-(SO_3H)_{1.8}(SO_2NH_2)_{1.0}(SO_2NHC_2H_4NC_2H_4OH)_{1.2}$$

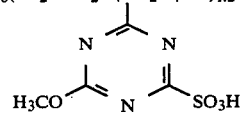

30 g of the dye were mixed with 6 g of 2-naphthol condensed with 10 molecular proportions of ethylene oxide, 0.75 g of sodium diethylaniline sulphonate and 43.25 g of water, the pH being adjusted to 7.5. The formulation was fluid over a wide range of temperatures. Formulations containing conventional solubilising additives, for example urea, became extremely viscous on storage at 60° C.

EXAMPLE 7

A liquid composition was prepared containing the sodium salt of the following blue dye:

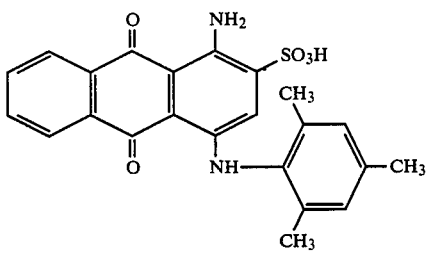

The components of the mixture were as follows:

| Dye (commercial brand) | 1.0 g |
| --- | --- |
| Distilled water | 47.5 g |
| Sodium chloride | 1.5 g |

The mixture was left to stand for 30 minutes and then filtered to remove any precipitated dye. The optical density of the filtrate was determined at the wavelength of maximum absorbance of the dye and multiplied by a factor $\mu_5$ to generate the value 1.0.

A second mixture was prepared in the same way except that 2 g of the water were replaced by 2 g of a 10% solution of the adduct of 2-naphthol with 10 moles of ethylene oxide. The mixture was filtered after 30 minutes standing and the optical density of the filtrate recorded. The value of the optical density multiplied by $\mu_5$ was 16.7 indicating that much more dye was dissolved in the filtrate than in the absence of the naphthol adduct.

EXAMPLE 8

A liquid composition was prepared containing the sodium salt of the following red dye:

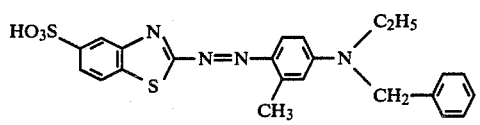

The components of the mixture were as follows:

| Dye (commercial brand) | 4.5 g |
|---|---|
| Distilled water | 44.0 g |
| Sodium chloride | 1.5 g |

The mixture was left to stand for 30 minutes and then filtered to remove any precipitated dyestuff. The optical density of the filtrate was determined at the wavelength of maximum absorbance of the dye and multiplied by a factor $\mu_6$ to generate the value 1.0.

A second mixture was prepared in the same way except that 9 g of the water were replaced by 9 g of a 10% solution of the adduct of 2-naphthol with 10 moles of ethylene oxide. The mixture was filtered after 30 minutes standing and the optical density of the filtrate recorded. The value of the optical density multiplied by $\mu_6$ was 2.1 indicating that substantially more dye was dissolved in the filtrate than in the absence of the naphthol adduct.

EXAMPLE 9

A liquid composition was prepared containing the sodium salt of the following blue dye:

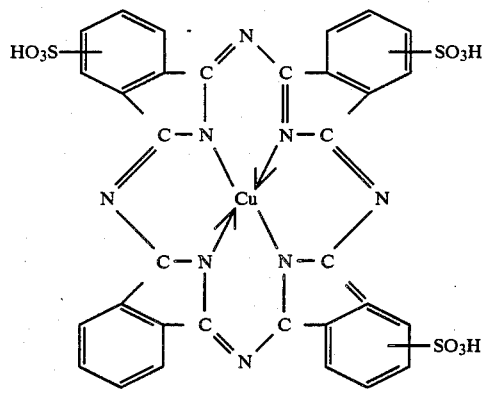

The components of the mixture were as follows:

| Dye (commercial brand) | 2 g |
|---|---|
| Distilled water | 46.5 g |
| Sodium chloride | 1.5 g |

The mixture was left to stand for 30 minutes and then filtered to remove any precipitated dye. The optical density of the filtrate was determined at the wavelength of maximum absorbance of the dye and multiplied by a factor $\mu_7$ to generate the value 1.0.

A second mixture was prepared in the same way except that 4 g of the water were replaced by 4 g of a 10% solution of the adduct of 2-naphthol with 10 moles of ethylene oxide. The mixture was filtered after 30 minutes standing and the optical density of the filtrate recorded. The value of the optical density multiplied by $\mu_7$ was 1.3 indicating that more dye was dissolved in the filtrate than in the absence of the naphthol adduct.

We claim:
1. A liquid dye preparation comprising an aqueous solution containing at least 0.5% by weight of a water-soluble anionic dye and at least 0.1% by weight of a surfactant of the formula:

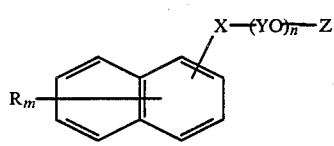

wherein
R represents a non-ionic substituent selected from the group consisting of halogen, alkoxy, alkenyl and alkyl,
m represents an integer from 0 to 3,
X represents a divalent bridging group selected from the class consisting of —S—, —COO— and —NQ— wherein Q is hydrogen, lower, alkyl or a further $(YO)_nZ$ group,
Y represents a $C_{2-4}$ alkylene radical,
n represents an integer of at least 2, and
Z represents hydrogen, alkyl or sulpho.

2. A liquid dye preparation according to claim 1 wherein the surfactant has the formula:

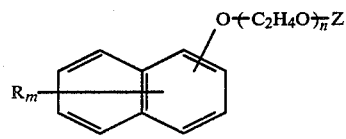

wherein
R is $C_{1-4}$ alkyl,
m is 0 or 1,
n is 3–100, and
Z is H or $SO_3$H.

3. A liquid dye preparation according to claim 2 wherein n is 8–12.

4. A liquid dye preparation according to claim 3 wherein the surfactant is the adduct of 2-naphthol with 10 molecular proportions of ethylene oxide.

5. A liquid dye preparation according to claim 1 wherein the water-soluble, anionic dye is an azo, anthraquinone, triphenodioxazine or phthalocyanine dye.

6. A liquid dye preparation according to claim 1 containing at least 1% by weight of water-soluble anionic dye.

7. A liquid dye preparation according to claim 6 containing at least 10% by weight of water-soluble anionic dye.

8. A process for the coloration of textile materials using a liquid dye preparation as defined in claim 1.

9. A liquid dye preparation according to claim 2 wheren n is 5–30.

* * * * *